Patented June 8, 1926.

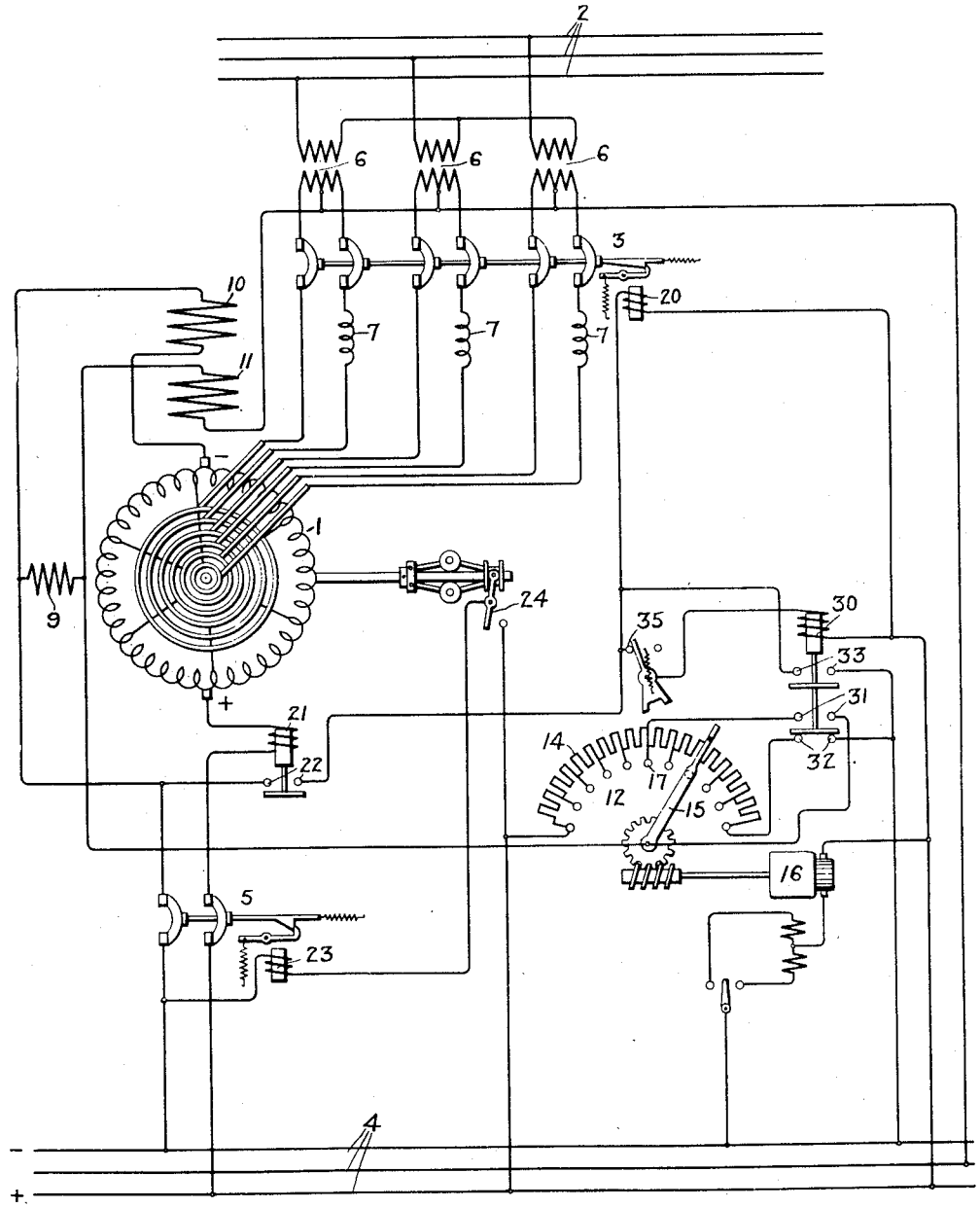

1,588,398

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

ROTARY TRANSFORMER.

Application filed April 4, 1924. Serial No. 704,291.

My invention relates to rotary transformers for transferring power from one electric circuit to another and particularly to synchronous converters for transferring power from an alternating current supply circuit to a direct current circuit or network.

It is well known in the art that the direct current voltage of a synchronous converter may be varied by connecting a suitable impedance, preferably a reactance, in the alternating current circuit of the converter and varying the excitation of the converter so as to change the power factor of the converter. With such an arrangement there are times when the converter operates under-excited and other times when it operates over-excited. If, for any reason, the connection between the alternating current circuit and the converter is opened when the converter is running under-excited, the converter speeds up and the over-speed protective device, with which the converter is provided, operates and effects the opening of the circuit breaker between the converter and the direct current circuit. If the converter is over-excited, the speed of the converter decreases with the opening of the connection between the alternating current circuit and the converter so that the over-speed device does not operate to effect the disconnection of the converter from the direct current circuit.

Some companies find it very desirable from an operating standpoint not to disconnect the converter from the direct current circuit when it is disconnected from the alternating current circuit in response to an abnormal condition, such as an overload. If the converter remains connected to the direct current circuit the converter can be promptly resynchronized and placed in service after the abnormal condition has disappeared. Therefore it is evident that it is desirable to prevent the speed of the converter from increasing to a value sufficient to effect the disconnection of the converter from the direct current circuit when the converter is operating under-excited and is disconnected from the alternating current circuit.

One object of my invention is to provide an improved arrangement for preventing the speed of a rotary transformer, which is arranged to transfer power from an alternating current circuit to a direct current transformer or vice versa, from exceeding a predetermined value when the transformer is disconnected from the alternating current circuit.

In accordance with my invention I provide means for increasing the excitation of the rotary converter when the converter is disconnected from the alternating current circuit.

My invention will be better understood from the following description when taken in connection with the accompanying drawing, which shows diagrammatically one embodiment of my invention, and its scope will be pointed out in the appended claims.

In the drawing 1 is a synchronous converter the alternating current side of which is arranged to be connected to an alternating current circuit 2 by a suitable circuit breaker 3 and the direct current side of which is arranged to be connected to a direct current circuit 4 by a suitable circuit breaker 5. Transformers 6 are interposed between the converter 1 and the alternating current circuit 2.

In order that variations in the excitation of the converter may change the direct current voltage of the converter, reactors 7 are connected between the secondary windings of the transformers 6 and the alternating current terminals of the converter. As is well known in the art, under certain conditions there may be sufficient reactance in the transformers so that the desired voltage regulation may be obtained without using separate reactors.

The direct current circuit 4 is shown as a three-wire circuit having its two outside or high voltage conductors arranged to be connected to the direct current brushes of the converter when the circuit breaker 5 is closed and having its middle or neutral conductor connected to the middle point of the secondary windings of the transformers 6. This arrangement of supplying power to a three-wire circuit by means of a synchronous converter is old and well known in the art.

It is assumed that the circuit 4 forms a part of a direct current network so that the circuit 4 is energized when the converter 1 is not in operation.

The converter 1 is provided with a main field winding 9, a series commutating field winding 10 and an auxiliary commutating field winding 11. For controlling the excitation of the field windings 9 and 11, I provide a rheostat 12 of the potentiometer type. The resistor 14 of the rheostat 12 is connected across the outside conductors of the direct current circuit 4 and the movable arm 15 of the rheostat is connected to one end of the field windings 9 and 11. The other end of the field winding 9 is connected to one of the outside conductors of the direct current circuit 4 and the other end of the field winding 11 is connected to the neutral conductor of the direct current circuit. Therefore, it will be evident that when the movable arm 15, which may be operated by any suitable means, such as a reversible motor 16, is in engagement with the middle contact 17 on the resistor 14, there is no current through the commutating field winding 11 as it is connected across equipotential points. Preferably under such conditions the excitation of the main field winding 9 is such that the power factor of the converter is substantially unity.

With the arrangement shown, when the movable arm 15 is moved in a clockwise direction from the middle contact 17, the excitation of the main field winding 9 decreases and the excitation of the auxiliary commutating field winding 11 increases, and when the movable arm 15 is moved in counter-clockwise direction from the middle contact 17, the excitation of the main field winding 9 increases and the excitation of the auxiliary commutating field winding 11 increases, but the current through the commutating winding is in the opposite direction from the current through it when the arm 15 is moved in a clockwise direction. The object in reversing the direction of the current through the commutating winding 11 in this manner is to prevent sparking from being produced when the power factor of the alternating current taken by the converter varies from unity. Preferably the auxiliary commutating field winding 11 is arranged in such a manner with respect to the series commutating field winding 10, which is connected in series with the direct current brushes of the converter, that said auxiliary winding opposes the series winding when the converter is operating with lagging current and assists said series winding when the converter is operating with leading current. By properly designing the resistor 14 it is evident that the excitation of the main field winding 9 may be so varied by moving the arm 15 that the converter 1 takes lagging current when the arm occupies a position to the right of the contact 17, and takes leading current when the arm occupies a position to the left of the contact 17. With such an arrangement the movement of the movable arm 15 not only adjusts the excitation of the main field winding 9 so as to change the direct current voltage of the converter, but also controls the direction and magnitude of the current through the auxiliary commutating field winding 11 to correspond to the power factor.

In order to protect the converter against overloads it is desirable to disconnect the converter from one of the circuits upon the occurrence of a predetermined overload. From an operating standpoint it is usually desirable to disconnect the converter from only the alternating current circuit upon the occurrence of an overload. This leaves the converter connected to the direct current circuit so that the converter continues to run as a direct current motor after being disconnected from the alternating current source. In order to prevent the converter from running away, due to some abnormal condition such as an open field circuit when operating as a direct current motor, it is the usual practice to provide the converter with an overspeed device for controlling the circuit breaker between the converter and the direct current circuit.

In the arrangement shown the circuit breaker 3 is of the well-known latched-in type and is provided with a trip coil 20 which is arranged to be energized to trip the circuit breaker when an overload relay 21 in the direct current circuit of the converter closes its contacts 22. The circuit breaker 5 is also of the well known latched-in type and is provided with a trip coil 23 the circuit of which is arranged to be completed by a centrifugally operated switch 24 when the speed of the converter exceeds a predetermined value.

It is desirable that the circuit breaker 5 should not open each time the circuit breaker 3 opens in response to an overload. It will be evident, however, that if the field winding 9 is under-excited when the circuit breaker 3 opens, the speed of the converter will increase and may cause the speed switch 24 to close its contacts and trip the circuit breaker 5. In order to prevent this undesirable opening of the circuit breaker 5 I provide a relay 30, the circuit of which is completed by the overload relay 21 when it closes its contacts 22. This relay 30, when energized, completes a circuit between the movable arm 15 of the rheostat 14 and a predetermined point on the resistor 14 so that if more than a predetermined amount of the resistor is connected in the circuits of the field windings 9 and 11 all of the resistor above this predetermined amount is short circuited. As shown, the contacts 31 of the relay 30 are arranged to complete a circuit from the middle contact 17 of the resistor 14 to the movable arm 15 so that if the movable arm is in engagement with a contact to the right of the contact 17, all of the resistance between these two contacts is short circuited by the relay 30. Also in order to increase the excitation of the field winding 9 when the relay 30 is energized, this relay is provided with contacts 32 which are connected in the portion of the resistor circuit which is normally in parallel with the field windings 9 and 11. When the relay 30 is energized the contacts 32 are opened so that this portion of the resistor circuit is opened.

In order that the relay 30 may remain energized after the circuit breaker 3 opens and the overload relay 31 opens its contacts, the relay 30 closes a locking circuit for itself through its contacts 33, these contacts being arranged to complete a circuit in shunt around the contacts 22 of the overload relay.

It will be evident that if the movable arm 15 is in engagement with one of the contacts of the resistor 14 to the left of the contact 17, there is no need of increasing the excitation of the converter when the circuit breaker 3 opens because under such condition the converter is over-excited and therefore the speed will decrease. Consequently there is no need of short circuiting a portion of the resistor 14. In order to accomplish this result, the contacts 35 are provided in the circuit of the relay 30 and are arranged to be opened by the movable arm 15, in any well known manner, when it moves by the contact 17 in a counter-clockwise direction and to be closed when it moves by the contact 17 in a clockwise direction.

The operation of the arrangement shown is as follows: With both circuit breakers 3 and 5 closed, the direct current voltage of the converter 1 is controlled in the usual manner by adjusting the rheostat 12.

Upon the occurrence of a short circuit, the overload relay 21 closes its contacts 22 and completes, across the outside conductors of the direct current circuit 4, a circuit for the trip coil 20 of the circuit breaker 3 so that the converter is disconnected from the supply circuit 2. If the movable arm 15 of the rheostat 12 is to the right of the contact 17, so that the contacts 35 are closed, the closing of the contacts 22 of the overload relay 21 also completes a circuit for the relay 30. This circuit is also connected across the outside conductors of the direct current circuit 4. The closing of the contacts 33 completes the locking circuit of the relay 30 so that its remains energized after the overload relay 21 opens its contacts when the circuit breaker 3 opens. The closing of the contacts 31 and the opening of the contacts 32 decreases the resistance of the circuit of the field winding 9 in the manner above described so that speed of the converter does not increase to a value sufficient to cause the speed switch 24 to close its contacts and trip the breaker 5.

After the overload has disappeared and the operator desires to reconnect the converter to the supply circuit 2, he controls the motor 16 so that the movable arm 15 opens the contacts 35 and deenergizes the relay 30 and then varies the speed of the converter until the converter is in synchronism with the supply circuit. He then closes the circuit breaker 3.

If the movable arm 15 is to the left of the contact 17 when the circuit breaker 3 opens in response to an overload, the contacts 35 are open so that the relay 30 is not energized. As described above, under such conditions the excitation of the converter is sufficient to prevent the converter running away and therefore there is no need of increasing the excitation.

While I have shown and described only one embodiment of my invention, it is evident that various modifications may be made therein and I desire it to be understood that I intend to cover in the appended claims all those modifications that fall within the true spirit and scope of my invention.

What I claim as new and desire to secure by Letters Patent of the United States, is:

1. In combination, an alternating current circuit, a direct current circuit, a rotary transformer adapted to be connected to both of said circuits to transfer power from one circuit to the other, means responsive to an abnormal circuit condition for effecting the disconnection of said transformer from said alternating current circuit, and means for increasing the excitation of said transformer when said transformer is disconnected from said alternating current circuit in response to the operation of said abnormal circuit condition responsive means.

2. In combination, an alternating current circuit, a direct current circuit, a rotary transformer adapted to be connected to both of said circuits to transfer power from one circuit to the other, overload responsive means for disconnecting said transformer from said alternating current circuit, and means controlled by said overload responsive means for increasing the excitation of said transformer when said transformer is disconnected from said alternating current circuit and the excitation of said transformer is less than a predetermined value.

3. In combination, an alternating current supply circuit, a direct current distribution circuit, a rotary transformer adapted to be connected between said circuits, a field circuit for said transformer, an adjustable resistance in said field circuit, means for effecting the disconnection of said transformer from said supply circuit, means controlled by said last mentioned means for short circuiting a portion of said adjustable resistance to increase the excitation of said transformer, and means for preventing the operation of said short circuiting means when less than a predetermined amount of said adjustable resistance is connected in said field circuit.

4. In combination, an alternating current supply circuit, a direct current distribution circuit, a rotary transformer adapted to be connected between said circuits, a field winding for said transformer connected across said distribution circuit, an adjustable rheostat in series with said winding, an overload relay responsive to the current supplied to said distribution circuit by said transformer for effecting the disconnection of said transformer from said supply circuit, a relay arranged to short circuit a portion of the resistance of said rheostat, a circuit for said last mentioned relay controlled by said overload relay, and contacts in said relay circuit controlled by the adjustable arm of said rheostat.

5. In combination, an alternating current supply circuit, a direct current distribution circuit, a rotary transformer, switching means for connecting said converter to said supply circuit and to said distribution circuit, a field circuit for said transformer, an adjustable rheostat in said field circuit having a movable member arranged to be moved to vary the resistance of said field circuit, an overload relay responsive to the current supplied to said distribution circuit by said transformer for effecting the disconnection of said transformer from said supply circuit, a relay arranged to short circuit a portion of the resistance of said rheostat, a circuit for said short circuiting relay arranged to be completed by said overload relay upon the occurrence of a predetermined overload, a locking circuit for said short circuiting relay arranged to be completed when said relay is energized, and contacts in the circuits of said short circuiting relay arranged to be opened by the movable arm of said rheostat when it is in such a position that the short circuiting of a portion of said rheostat by said short circuiting relay does not change the excitation of said transformer.

6. In combination, an alternating current supply circuit, a three-wire direct current network, a synchronous converter having a main field winding and a commutating field winding, switching means for connecting said converter to said supply circuit and said network, means for varying the excitation of said field windings comprising a resistor connected across the outside conductors of said network and a movable contact arranged to engage taps on said resistor, said main field winding being connected between one of the outside conductors of said network and said movable contact and said commutating winding being connected between said movable contact and the neutral conductor of said network, means for effecting the operation of said switching means to disconnect said transformer from said supply circuit, and means controlled by said last mentioned means for connecting said movable contact to a point on said resistor so as to short circuit a portion of the resistor in series with said field windings and for disconnecting said resistor from one of the outside conductors of said network.

7. In combination, an alternating current supply circuit, a three-wire direct current network, a synchronous converter having a main field winding and a commutating winding, switching means for connecting said converter to said circuits, means for varying the excitation of said field windings comprising a resistor connected across the outside conductors of said network and a movable contact arranged to engage taps on said resistor, said main field winding being connected to said movable contact and one of the outside conductors of said network and said commutating field winding being connected to said movable contact and the neutral conductor of said network, means responsive to the speed of said converter for effecting the disconnection of said converter from said network, an overload relay responsive to the current supplied by said transformer to said network for effecting the disconnection of said transformer from said supply circuit, a magnet arranged to short circuit a portion of said resistor and to disconnect said resistor from one of the outside conductors of said network, and a circuit for said magnet controlled by said overload relay.

8. In combination, an alternating current supply circuit, a three-wire direct current network, a synchronous converter having a main field winding and a commutating winding, switching means for connecting said converter to said circuits, means for varying the excitation of said field windings comprising a resistor connected across the outside conductors of said network and a movable contact arranged to engage taps on said resistor, said main field winding being connected to said movable contact and one of the outside conductors of said network and said commutating field winding being connected to said movable contact and the neutral conductor of said network, means responsive to the speed of said converter for effecting the disconnection of said converter from said network, an overload relay responsive to the current supplied by said transformer to said network for effecting the disconnection of said transformer from said supply circuit, a magnet arranged to short circuit a portion of said resistor and to disconnect said resistor from one of the outside conductors of said network, a circuit for said magnet arranged to be completed by said overload relay upon the occurrence of a predetermined overload, a locking circuit for said magnet, and contacts in the circuits of said magnet arranged to be opened by the movable contact of said rheostat when it is in such a position that the operation of said magnet does not change the excitation of said converter.

9. In combination, a dynamo electric machine, a field circuit for said machine, current limiting means in said circuit, a member adapted to be moved to vary the amount of said current limiting means in said field circuit and switching means for changing the connections of said current limiting means so that a predetermined amount thereof is connected in said electric circuit irrespectively of the position of said member.

10. In combination, a dynamo electric machine, a field circuit for said machine, a resistor in said field circuit, an adjustable member for varying the amount of said resistor connected in said field circuit, and means for changing the connections of said resistor so that a predetermined amount thereof is connected in said circuit irrespectively of the position of said adjustable member, said means being operative only when said adjustable member is in a certain portion of its path of movement.

11. In combination, a dynamo electric machine, a field circuit for said machine, a resistor in said field circuit, an adjustable member for varying the amount of said resistor connected in said field circuit, and means for changing the connections of said resistor so that only a predetermined portion thereof is connected in said circuit, said means being operative only when said adjustable member is in a position to connect more than a predetermined amount of said resistor in said field circuit.

12. In combination, a dynamo electric machine, a field circuit for said machine, a resistor in said field circuit, an adjustable member for varying the amount of said resistor connected in said field circuit, a relay for varying the connections of said resistor so as to change the amount thereof connected in said field circuit, a circuit for said relay, and contacts in said relay circuit controlled by said adjustable member.

13. In combination, a dynamo electric machine, a field circuit for said machine, a resistor in said field circuit, an adjustable member for varying the amount of said resistor connected in said field circuit, a relay for changing the connections of said resistor so that a predetermined amount thereof is connected in said field circuit irrespectively of the position of said adjustable member, a circuit for said relay, and contacts in the circuit of said relay arranged to be operated when said adjustable member is in a position to connect the same predetermined amount of resistor in said field circuit as is connected therein by the operation of said relay.

In witness whereof, I have hereunto set my hand this 3rd day of April, 1924.

THEOPHILUS F. BARTON.